(12) United States Patent
Machhammer et al.

(10) Patent No.: US 10,099,923 B2
(45) Date of Patent: Oct. 16, 2018

(54) PROCESS FOR PRODUCING SYNTHESIS GAS

(71) Applicant: BASF SE, Ludwigshafen (DE)

(72) Inventors: Otto Machhammer, Mannheim (DE); Grigorios Kolios, Neustadt (DE); Andreas Bode, Mannheim (DE); Hans-Juergen Maass, Dresden (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/504,982

(22) PCT Filed: Aug. 13, 2015

(86) PCT No.: PCT/EP2015/001675
§ 371 (c)(1),
(2) Date: Feb. 17, 2017

(87) PCT Pub. No.: WO2016/026562
PCT Pub. Date: Feb. 25, 2016

(65) Prior Publication Data
US 2017/0275161 A1 Sep. 28, 2017

(30) Foreign Application Priority Data
Aug. 19, 2014 (EP) .................................. 14002872

(51) Int. Cl.
*C01B 3/24* (2006.01)
*C01B 3/28* (2006.01)
(Continued)

(52) U.S. Cl.
CPC .................. *C01B 3/28* (2013.01); *C01B 5/00* (2013.01); *C01B 31/18* (2013.01);
(Continued)

(58) Field of Classification Search
CPC .. C01B 3/28; C01B 31/18; C01B 5/00; C01B 2203/0272
See application file for complete search history.

(56) References Cited

U.S. PATENT DOCUMENTS 4,265,868 A * 5/1981 Kamody .................. C01B 3/34
252/373
2012/0241676 A1 9/2012 Kim et al.
(Continued)

FOREIGN PATENT DOCUMENTS

DE  11 2010 003 184 T5  6/2012
DE  10 2013 021 418 A1  6/2014
(Continued)

OTHER PUBLICATIONS

International Search Report and Written Opinion dated Nov. 27, 2015 in PCT/EP2015/001675 with English language translation.
(Continued)

*Primary Examiner* — Paul A Wartalowicz
(74) *Attorney, Agent, or Firm* — Oblon, McClelland, Maier & Neustadt, L.L.P.

(57) ABSTRACT

The invention relates to a process for producing synthesis gas (5) in which hydrocarbon (2) is decomposed thermally in a first reaction zone (11) to hydrogen and carbon, and hydrogen formed is passed from the first reaction zone (Z1) into a second action zone (Z2) in order to be reacted therein with carbon dioxide (4) to give water and carbon monoxide. The characteristic feature here is that energy required for the thermal decomposition of the hydrocarbon is supplied to the first reaction zone (Z1) from the second reaction zone (Z2).

10 Claims, 1 Drawing Sheet

(51) Int. Cl.
*C01B 31/18* (2006.01)
*C01B 5/00* (2006.01)
(52) U.S. Cl.
CPC .............. *C01B 2203/0272* (2013.01); *C01B 2203/0838* (2013.01); *C01B 2203/1235* (2013.01)

(56) References Cited

U.S. PATENT DOCUMENTS

2014/0127121 A1  5/2014  Maass et al.
2014/0217327 A1  8/2014  Mass et al.

FOREIGN PATENT DOCUMENTS

WO   10 2011 106 645 A1   1/2013
WO   WO 2014/097142 A1   6/2014

OTHER PUBLICATIONS

International Preliminary Report on Patentability and Written Opinion dated Mar. 2, 2017 in PCT/EP2015/001675 with partial English language translation.
Mohammad Haghighi, et al., "On the reaction mechanism of $CO_2$ reforming of methane over a bed of coal char", Proceedings of the Combustion Institute, ELSEVIER, XP005817861, vol. 31, No. 2, 2007, pp. 1983-1990.

\* cited by examiner

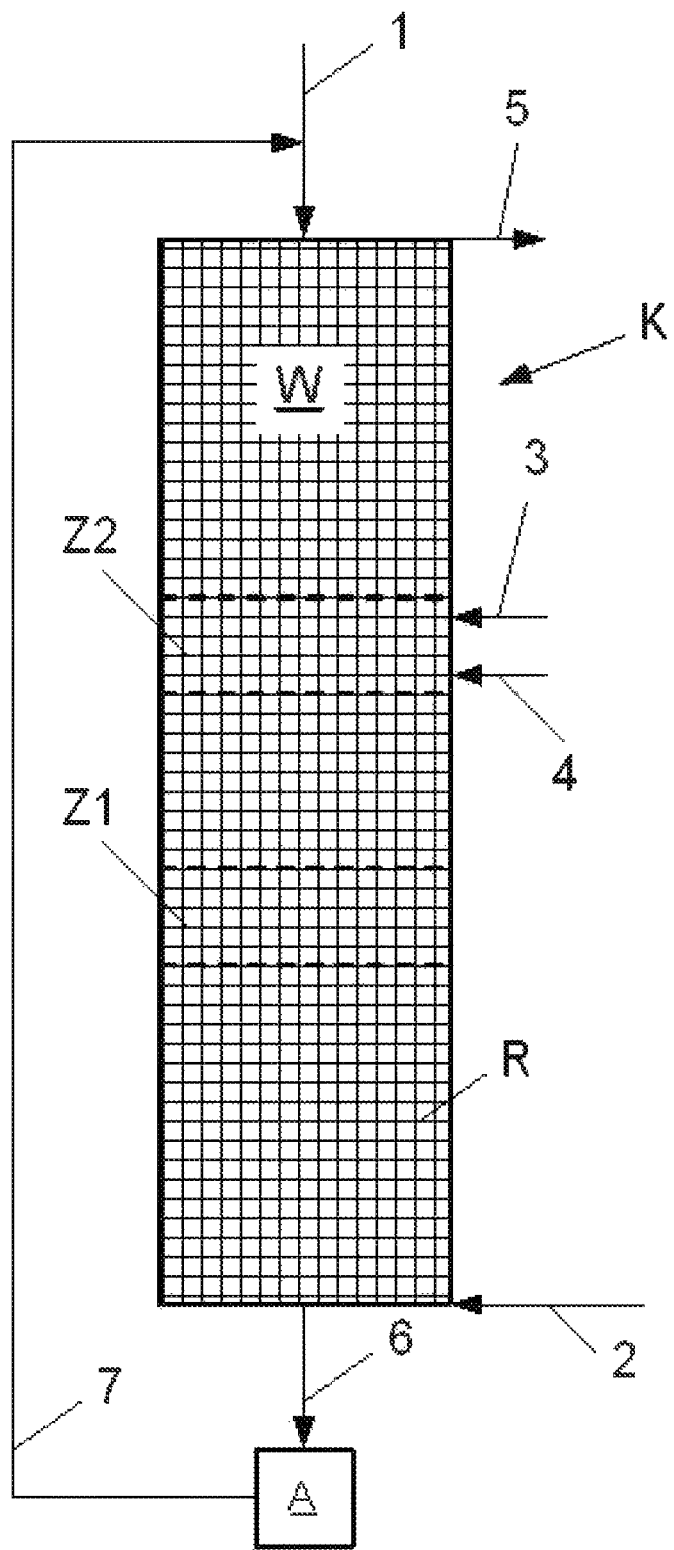

PROCESS FOR PRODUCING SYNTHESIS GAS

This application is a National Stage of PCT/EP2015/001676, which was filed on Aug. 13, 2015. This application is based upon and claims the benefit of priority to European Application No. 14002872.1, which was filed on Aug. 19, 2014.

The invention relates to a process for producing synthesis gas in which hydrocarbon is decomposed thermally in a first reaction zone to hydrogen and carbon, and hydrogen formed is passed from the first reaction zone into a second reaction zone in order to be reacted therein with carbon dioxide by a reverse water-gas shift to give water and carbon monoxide.

Synthesis gas is understood to mean a composition of matter comprising hydrogen and carbon monoxide, which can be used as a commodity chemical in a multitude of industrial processes. For example, synthesis gas is used for production of methanol, dimethyl ether or hydrocarbons.

A process of the same generic type is known from patent application WO2014097142. The application proposes passing the hydrogen formed in the first reaction zone into the second reaction zone at a temperature between 800 and 1400° C., in order to utilize the heat content thereof for the conversion of hydrogen and carbon dioxide to water and carbon monoxide.

Additionally known, from the prior art is patent application DE112010003184. The latter presents a process which first comprises the gasification of carbonaceous material to methane and then a thermal or catalytic decomposition of the methane and the conversion of carbon dioxide. The carbon formed in the thermal decomposition is sent in turn to the catalytic gasification. The heat needed for the thermal or catalytic decomposition of methane is provided via the combustion of carbon. However, the patent application does not state how the heat is exchanged between the various reaction steps.

It is an object of the present invention to specify a process of the type specified at the outset, with which better control of the synthesis gas production is possible and it can be conducted with a higher degree of thermal integration.

This object is achieved by supplying energy required for the thermal decomposition of the hydrocarbon to the first reaction zone from the second reaction zone.

The process according to the invention allows conduction of the thermal hydrocarbon decomposition that proceeds in the first reaction zone substantially independently from other reactions, and hence comparatively simple and good controllability thereof. Primarily via the temperature, it is possible, for example, to adjust the ratio of decomposed to undecomposed hydrocarbon and hence particularly to control the amount of hydrogen produced in the first reaction zone. Thus, only about half of the hydrocarbon used is decomposed in the presence of carbon at a temperature of about 800° C., whereas full conversion takes place at about 1200° C.

In order to convert hydrogen with carbon dioxide by a reverse water-gas shift to hydrogen and carbon monoxide, higher temperatures are generally needed than for the thermal hydrocarbon decomposition, and so it is possible to set a temperature gradient between the second reaction zone and the first, which is appropriately utilized in order to supply energy required for the thermal hydrocarbon decomposition to the first reaction zone in the form of heat. Preferably, the first reaction zone is supplied with the total amount of energy required for the thermal hydrocarbon decomposition from the second reaction zone.

The hydrocarbon, which is, for example, methane, ethane, propane or butane, is advantageously fed to the hydrocarbon decomposition in the form of a hydrocarbonaceous, gas. Preferably, the hydrocarbonaceous gas used is natural gas having a methane content, depending on the natural gas deposits and the method of processing, typically between 75 and 99 mol %.

The synthesis gas production according to the invention can be performed at ambient pressure or under pressure. Preferably, it is effected at pressures between 10 and 25 bar, more preferably—allowing for pressure drops—at the highest pressure under which a feedstock containing hydrocarbons is available for the hydrocarbon production. This may, for example, be the pressure under which natural gas can be drawn from a natural gas grid as feedstock.

A preferred configuration of the process according to the invention envisages generation of thermal energy required for performance thereof by oxidation or partial oxidation of a fuel comprising hydrocarbons and/or hydrogen and/or carbon. The oxidizing agent used is preferably air and/or oxygen-enriched air and/or oxygen of technical grade purity. Oxidation and partial oxidation can be conducted outside the reaction zones, for which purpose the fuel is mixed and reacted with an oxidizing agent. The hot gas formed is subsequently introduced into the first and/or second reaction zone, releasing a portion of its tangible heat directly or indirectly to the substances to be converted. However, the oxidizing agent can also be introduced into a reaction zone and be mixed and reacted therein with a fuel present, which may be hydrogen and/or carbon obtained in the first reaction zone by the hydrocarbon decomposition. Preferably, the oxidizing agent is supplied exclusively to the second reaction zone, it being possible to add carbon dioxide required for the reverse water-gas shift to the oxidizing agent upstream of the second reaction zone.

Alternatively or additionally to the oxidative methods described, thermal energy can also be generated by means of electrical power and provided for the synthesis gas production according to the invention. For this purpose, for example, one or more electrically conductive heating elements may be arranged in a reaction zone such that they become directly or indirectly thermally connected to the substances to be converted. An electrical conductive heating element is disposed either in fixed or mobile form within the reaction zone. For example, the heating element may be part of a moving or fluidized bed composed of, a solid granular electrically conductive solid which is, for example, carbon which is moved through the reaction zone.

In order to heat it, an electrical conductive heating, element is connected to a power source through which the electrical current is passed through the heating element. However, it is also possible to generate heat by electromagnetic induction. For this purpose, an induction coil disposed outside the two reaction zones provides a magnetic alternating field as soon as an electrical AC voltage is applied thereto. An electrically conductive heating element electrically insulated from the induction coil is arranged in such a way that eddy currents which can be induced therein by the magnetic alternating field lead to heating of the heating, element because of the ohmic losses. If the heating element consists of a ferromagnetic material, for example an iron-silicon or iron-nickel alloy or µ metal, core losses additionally contribute to heating of the heating element and hence to the formation of a temperature gradient between a heating element and its environment.

Depending on the reaction conditions, in the performance of the process according to the invention, only a portion of the hydrocarbon is decomposed in the first reaction zone to hydrogen and carbon, which means that undecomposed or incompletely decomposed hydrocarbon can be drawn off from the first reaction zone. A particularly preferred configuration of the process according to the invention envisages passing undecomposed or incompletely decomposed hydrocarbon from the first reaction zone into the second reaction zone and reacting it therein with water by steam reforming to give hydrogen and carbon dioxide. Appropriately, the water required for the reaction is water which is obtained in the second reaction zone by the reaction of hydrogen with oxygen and/or carbon dioxide. However, there is no intention to rule out supply of water from the outside.

An appropriate configuration of the process according to the invention envisages conducting the thermal hydrocarbon decomposition in the presence of a solid granular material. Under this condition, carbon formed in the first reaction zone is not a problem, since it can be deposited on the solid granular material and optionally removed from the first reaction zone together therewith. The solid granular material acts as a filter, and so it is possible to draw off hydrogen formed in particular, but also other gases, from the first reaction zone substantially free from carbon particles, and to conduct it, for example, into the second reaction zone. Carbon which gets into the second reaction zone in spite of the filter reaction described reacts with the oxygen present therein to give a carbon oxide which forms part of the synthesis gas directly or after the reverse water-gas shift.

Preferably, the solid granular material is conducted through the first reaction zone as a moving bed, appropriately with passage of the hydrocarbon to be converted in countercurrent to the granular material. For this purpose, it is sensible for the first reaction zone to be arranged in a reaction space configured as a vertical shaft, such that the movement of the moving bed arises under the action of gravity alone. However, the solid granular material can also be conducted through the first reaction zone in the form of a fluidized bed. Both variants allow a continuous or quasi-continuous mode of operation.

Advantageously, the reactions which proceed in the second reaction zone are also conducted in the presence of a solid granular material which is preferably conducted through the reaction zone as a moving bed. Preferably, the first and second reaction zones are connected by means of a moving bed consisting of solid granular material, which completely encompasses the two reaction zones and moves from the second to the first reaction zone. For this purpose, it is sensible for the two reaction zones to be arranged together, one on top of another in a reaction space configured as a vertical shaft, such that the movement of the moving bed arises under the action of gravity alone. The connection of the two reaction zones via the moving bed allows use of the solid granular material as a heat transfer agent with which heat is transported from the second reaction zone to the first.

If the solid granular material is conducted through the two reaction zones as a moving bed, a further preferred variant of the process according to the invention envisages introducing the solid material into the reaction space at ambient temperature, first heating it up to the maximum temperature of the second reaction zone therein and then transferring it into the first reaction zone, where it provides a portion of its heat for the reactions that proceed therein and is cooled at the same time. After leaving the first reaction zone, it is cooled down further, appropriately to close to ambient temperature, such that no cooling, or quenching of the solid granular material drawn off from the reaction space is required. To form and maintain the temperature profile described, it is proposed that a hydrocarbon-containing gas mixture at ambient temperature be introduced into the reaction space and conducted through the moving bed in countercurrent. On its way through the reaction space, the gas mixture exchanges heat with the moving bed in direct contact, with heating of the gas mixture to more than 1200° C. by the time it reaches the first reaction zone and simultaneous cooling of the moving bed. Gas flowing out of the first reaction zone is conducted further in countercurrent through the moving bed to the second reaction zone and is heated up in direct heat exchange therewith. The hot gases flowing out of the second reaction zone are cooled in direct heat exchange with the moving bed, such that they can be drawn off from the reaction space at a temperature between 50 and 500° C.

For performance of the process according to the invention, the solid granular material used may be a granular material consisting of corundum ($Al_2O_3$) or quartz glass ($SiO_2$) or mullite ($Al_2O_3.SiO_2$) or cordierite (($Mg,Fe)_2$ ($Al_2Si$)[$Al_2Si_4O_{18}$]) or steatite ($SiO_2.MgO.Al_2O_3$). Preference is given, however, to using a carbon-rich granular material formed from solid grains consisting entirely or predominantly of carbon, and having at least 50% by weight, preferably at least 80% by weight, further preferably at least 90% by weight of carbon, further preferably at least 95% by weight, especially at least 98% by weight of carbon.

The grains are advantageously present with an equivalent diameter, which can be determined by sieving with a particular mesh size, of 0.05 to 100 mm, preferably of 0.05 to 50 mm, further preferably 0.05 to 10 mm, further preferably 0.1 to 3 mm, further preferably 0.2 to 2 mm, especially 0.3 to 1 mm.

Advantageously, the density of the solid granular material is 0.15 to 2.25 g/ml, preferably 0.3 to 2 g/ml, further preferably 0.65 to 1.85 g/ml, especially 0.9 to 1.7 g/ml.

Advantageously, the porosity of the solid granular material is 0 to 0.95 ml/ml preferably 0.1 to 0.85 ml/ml, further preferably 0.15 to 0.7 especially 0.25 to 0.6 ml/ml.

Advantageously, the solid granular material is macroporous. The mean pore radius is advantageously 0.01 to 50 μm, preferably 0.1 to 20 μm, especially 0.5 to 5 μm. The specific surface area is advantageously 0.02 to 100 $m^2/g$, preferably 0.05 to 10 $m^2/g$, especially 0.2 to 2 $m^2/g$.

The solid granular material is advantageously spherical. In the process according to the invention, it is possible to use a multitude of different carbon-containing granular materials. A granular material of this type may, for example, consist predominantly of coal, coke, coke breeze and/or mixtures thereof. In addition, the carbon-containing granular material may contain 0% to 15% by weight, based on the total mass of the granular material, preferably 0% to 5% by weight, of metal, metal oxide and/or ceramic. A granular material of this type may consist, for example, entirely or partly of coke breeze unsuitable for use in a blast furnace because of its small particle size. Conceivable alternatives are granular materials consisting wholly or partly of low-grade coking plant coke based on brown coal or hard coal and/or of coke obtained from biomass. Preferably, the granular material consists of carbon which is produced in the process by thermal hydrocarbon decomposition and is circulated.

"Coke" in the present invention is understood to mean a porous fuel having a high carbon content (proportion by mass of C>85%).

Preference is given to conducting the process according to the invention without use of an active metal-containing catalyst.

The invention shall be more particularly described hereinafter with reference to a working example shown schematically in FIG. 1.

FIG. 1 shows a preferred configuration of the process according to the invention, which uses a reactor wherein a moving bed composed of a solid granular material is conducted through the reaction space thereof which comprises a first and a second reaction zone.

Via the feed 1, a solid granular material which is, for example, carbon produced by thermal hydrocarbon decomposition in the process is introduced at ambient temperature from the top into the reaction space R of the reactor K, through which it is subsequently conducted downward in a moving bed W under the action of gravity. A hydrocarbon-containing input gas 2 which is preferably natural gas is simultaneously passed into the reaction space R from the bottom and conducted upward through the moving bed W in countercurrent. The gas 2 which is at ambient temperature on entry into the reaction space R is heated up on its way upward in direct heat exchange with the moving bed W until it reaches the decomposition temperature of the hydrocarbon in the first reaction zone Z1, and the hydrocarbon decomposes under these conditions in an endothermic reaction to give hydrogen and carbon. The carbon formed here is predominantly deposited on the solid granular material of the moving bed W. Together with unconverted or only incompletely converted hydrocarbon, the hot hydrogen formed flows into the second reaction zone Z2 disposed above the first, in the course of which it is heated up further in direct heat exchange with the moving bed W. In the second reaction zone Z2, a portion of the hydrogen is combusted with oxygen which is fed in via line 3, and thus provides the heat of reaction required for the synthesis gas production. Alternatively or additionally, the heat of reaction can also be introduced into the reaction zone Z2 by means of electrical power. At least a portion of the water formed in the hydrogen combustion is reacted with carbon dioxide supplied via line 4 to give hydrogen and carbon monoxide. Hydrocarbon undecomposed or incompletely decomposed in the first reaction zone Z1 is reformed in the second reaction zone Z2 with water to give hydrogen and carbon monoxide, and so a synthesis'gas flows out of the second reaction zone 22 and is cooled in countercurrent with the moving bed W and is drawn off at the upper end of the reactor K via line 5 with a temperature of between 50 and 500° C.

At the lower end of the reactor K, solid granular material 6 is removed at a temperature close to ambient temperature and is fed to a processing unit A in which it is processed, for example, by removing the carbon deposited or by comminuting, sifting and classifying, in order to be recycled back into the reaction space R via line 7.

The invention claimed is:

1. A process for producing synthesis gas, the process comprising:
   thermally decomposing a hydrocarbon in a first reaction zone to hydrogen and a solid carbon; and
   passing the hydrogen formed from the first reaction zone into a second reaction zone, and reacting the hydrogen in the second reaction zone with carbon dioxide by a reverse water-gas shift to obtain water and carbon monoxide,
   wherein energy required for the thermally decomposing of the hydrocarbon is supplied to the first reaction zone from the second reaction zone by setting a temperature gradient between the second reaction zone and the first reaction zone.

2. The process according to claim 1, wherein the first reaction zone and the second reaction zone are connected by a moving bed comprising a solid granular material, and the moving bed moves from the second reaction zone to the first reaction zone.

3. The process according to claim 2, wherein the solid granular material is circulated.

4. The process according to claim 2, wherein gas leaving the second reaction zone is conducted in countercurrent to the moving bed and is cooled in direct heat exchange with the moving bed.

5. The process according to claim 2, wherein the hydrocarbon is conducted into the first reaction zone in countercurrent to the moving bed and is heated in direct heat exchange with the moving bed.

6. The process according to claim 2, wherein solid carbon deposited on the solid granular material is removed downstream of the first reaction zone and withdrawn from the moving bed.

7. The process according to claim 1, wherein thermal energy is generated in the second reaction zone by oxidation of hydrogen, by electrical power, or by a combination thereof.

8. The process according to claim 1, wherein hydrocarbon which is undecomposed or incompletely decomposed in the first reaction zone is passed into the second reaction zone and reacted in the second reaction zone with water to obtain hydrogen and carbon dioxide.

9. The process according to claim 1, wherein the solid granular material is corundum ($Al_2O_3$), quartz glass ($SiO_2$), mullite ($Al_2O_3.SiO_2$), cordierite (($Mg,Fe)_2(Al_2Si)$ $[Al_2Si_4O_{18}]$), steatite ($SiO_2.MgO.Al_2O_3$), coal, coke or carbon produced in the process by thermal hydrocarbon decomposition.

10. The process according to claim 1, wherein the hydrocarbon is a hydrocarbonaceous gas.

* * * * *